(12) United States Patent
Chen (10) Patent No.: US 12,482,388 B2
(45) Date of Patent: Nov. 25, 2025

(54) GATE DRIVING CIRCUIT AND RELATED DISPLAY PANEL

(71) Applicant: TCL China Star Optoelectronics Technology Co., Ltd., Guangdong (CN)

(72) Inventor: Zhixiang Chen, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/771,913

(22) PCT Filed: Apr. 18, 2022

(86) PCT No.: PCT/CN2022/087288
§ 371 (c)(1),
(2) Date: Apr. 26, 2022

(87) PCT Pub. No.: WO2023/178771
PCT Pub. Date: Sep. 28, 2023

(65) Prior Publication Data
US 2024/0169873 A1 May 23, 2024

(30) Foreign Application Priority Data
Mar. 24, 2022 (CN) .......................... 202210297387.6

(51) Int. Cl.
*G09G 3/20* (2006.01)
(52) U.S. Cl.
CPC ....... *G09G 3/20* (2013.01); *G09G 2300/0408* (2013.01); *G09G 2310/0267* (2013.01); *G09G 2330/02* (2013.01)

(58) Field of Classification Search
CPC ............. G09G 3/20; G09G 2300/0408; G09G 2310/0267; G09G 2330/02
See application file for complete search history.

(56) References Cited

U.S. PATENT DOCUMENTS

2016/0164514 A1\* 6/2016 Xiao .................... G09G 3/3674
327/109
2016/0275895 A1\* 9/2016 Dai ......................... G11C 19/00
(Continued)

FOREIGN PATENT DOCUMENTS

CN 106157914 11/2016
CN 106409213 2/2017
(Continued)

OTHER PUBLICATIONS

Zeng, Mian, Translation of CN 106328084, Jan. 11, 2017 (Year: 2017).\*

(Continued)

*Primary Examiner* — Dmitriy Bolotin (57) ABSTRACT

Embodiments of the present disclosure are directed to a gate driving circuit and a display panel. The gate driving circuit includes a plurality of cascaded gate driving units. Each of the gate driving unit includes a pull-up control module, a pull-up module electrically connected to the pull-up control module through a first node and electrically connected to a scan line, a pull-down module electrically connected to the scan line, and a first pull-down maintaining module. The first pull-down maintaining module includes a first auxiliary module and a first pull-down maintaining transistor having a drain connected to the first node. The first auxiliary module, electrically connected to a gate of the first pull-down maintaining transistor, and configured to control an on/off state of the first pull-down maintaining transistor.

16 Claims, 4 Drawing Sheets

(56) References Cited

U.S. PATENT DOCUMENTS

| | | | |
|---|---|---|---|
| 2018/0226035 A1 | 8/2018 | Wang | |
| 2018/0336835 A1* | 11/2018 | Liu | G09G 3/34 |
| 2019/0197973 A1* | 6/2019 | Chen | G09G 3/3266 |
| 2020/0020266 A1* | 1/2020 | Feng | G11C 19/28 |

FOREIGN PATENT DOCUMENTS

| | | |
|---|---|---|
| CN | 107705768 | 2/2018 |
| CN | 109935191 | 6/2019 |
| CN | 112037728 | 12/2020 |
| CN | 113178175 | 7/2021 |
| CN | 113593460 | 11/2021 |
| CN | 113658539 | 11/2021 |

OTHER PUBLICATIONS

International Search Report and the Written Opinion Dated Nov. 29, 2022 From the International Searching Authority Re. Application No. PCT/CN2022/087288 and Its Translation Into English. (20 Pages).

Notification of Office Action and Search Report Dated Nov. 1, 2024 From The State Intellectual Property Office of the People's Republic of China Re. Application No. 202210297387.6 and Its Translation Into English. (17 Pages).

Notification of Office Action and Search Report Dated Mar. 30, 2025 From The State Intellectual Property Office of the People's Republic of China Re. Application No. 202210297387.6 and Its Translation Into English. (17 Pages).

* cited by examiner

GATE DRIVING CIRCUIT AND RELATED DISPLAY PANEL

RELATED APPLICATIONS

This application is a National Phase of PCT Patent Application No. PCT/CN2022/087288 having International filing date of Apr. 18, 2022, which claims the benefit of priority of Chinese Patent Application No. 202210297387.6 filed on Mar. 24, 2022. The contents of the above applications are all incorporated by reference as if fully set forth herein in their entirety.

FIELD AND BACKGROUND OF THE INVENTION

The present disclosure relates to a display technology, and more particularly, to a gate driving circuit and a related display panel.

The Gate Driver on Array (GOA) technology is widely used because it makes it easier to achieve a narrow side frame of a display screen.

A pull-down maintaining unit is a necessary component in each stage of GOA circuit. When the gate signal outputted by the GOA circuit is pulled down, the pulled-down voltage could be maintained. However, due to the actual manufacturing process and the circuit design, the gate voltage of the pull-down maintaining transistor of the pull-down maintaining unit is positive. When the pull-down maintaining transistor is continuously working, the threshold voltage of the pull-down maintaining transistor may shift such that the pull-down maintaining transistor may not normally maintain the gate voltage as a low voltage at a late stage. This results in abnormal gate voltage and thus lowers the display quality.

Therefore, the pull-down maintaining transistor in the conventional GOA circuit may result in the abnormality of the gate signal when it continuously work for a long time. This may lower the display quality and needs to be improved.

SUMMARY OF THE INVENTION

One objective of an embodiment of the present disclosure is to provide a gate driving circuit and a display panel, to solve the technical issue of the pull-down maintaining transistor in the conventional GOA circuit that results in the abnormality of the gate signal when it is continuously working.

According to an embodiment of the present disclosure, a gate driving circuit is disclosed. The gate driving circuit includes a plurality of cascaded gate driving units. Each of the gate driving unit includes a pull-up control module, a pull-up module electrically connected to the pull-up control module through a first node and electrically connected to a scan line, a pull-down module electrically connected to the scan line, and a first pull-down maintaining module. The first pull-down maintaining module includes a first auxiliary module and a first pull-down maintaining transistor having a drain connected to the first node. The first auxiliary module, electrically connected to a gate of the first pull-down maintaining transistor, and configured to control an on/off state of the first pull-down maintaining transistor.

According to an embodiment of the present disclosure, a display panel is disclosed. The display panel comprises the above-mentioned gate driving circuit.

The present disclosure discloses a gate driving circuit and a display panel. The gate driving circuit includes a plurality of cascaded gate driving units. Each of the gate driving unit includes a pull-up control module, a pull-up module electrically connected to the pull-up control module through a first node and electrically connected to a scan line, a pull-down module electrically connected to the scan line, and a first pull-down maintaining module. The first pull-down maintaining module includes a first auxiliary module and a first pull-down maintaining transistor having a drain connected to the first node. The first auxiliary module, electrically connected to a gate of the first pull-down maintaining transistor, and configured to control an on/off state of the first pull-down maintaining transistor. The present disclosure utilizes a first auxiliary module, which is electrically connected to the gate of the first pull-down maintaining module, to control the on/off state of the pull-down maintaining transistor. By turning off the pull-down maintaining transistor, it could prevent the pull-down maintaining transistor from being turned on for too long to control the scan line to output a correct gate signal. This alleviates the risk of display abnormality and improves the display quality.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It will be further understood that the terms "first," "second," "third," and "fourth," when used in this specification, claim and drawings, are used to distinguish different objects, rather than to describe a specific order. It will be further understood that the terms "comprises" and/or "comprising," when used in this specification, specify the presence of stated features, products, steps, operations, elements, and/or components, but do not preclude the presence or addition of one or more other features, products, steps, operations, elements, components, and/or groups thereof.

As used herein, an "embodiment" means that a particular feature, structure, or characteristic described in connection with the embodiment can be included in at least one embodiment of the present application. The appearances of the phrase in various places in the specification are not necessarily all referring to the same embodiment, nor a separate or alternative embodiment that is mutually exclusive of other embodiments. It is explicitly and implicitly understood by those skilled in the art that the embodiments described herein may be combined with other embodiments.

The embodiments of the present disclosure are directed to a gate driving circuit. The gate driving circuit includes but is not limited to the following embodiments and combinations of the following embodiments.

According to an embodiment of the present disclosure, a gate driving circuit is disclosed. The gate driving circuit comprises cascaded gate driving units. Here, the n t h stage of the gate driving unit is taken as an example for illustration. Please refer to FIGS. 1-4. The $n^{th}$-stage gate driving unit 100 comprises: a pull-up control module 10, a pull-up module 20, a pull-down module 30, and a pull-down maintaining module 40. The pull-up module 20 is electrically connected to the pull-up control module 10 through a first node Q(n) and electrically connected to a scan line. The pull-down module 30 is electrically connected to the scan line. The first pull-down maintaining module 40 comprises a first pull-down maintaining transistor T42 and a first auxiliary module 401. The drain of the first pull-down maintaining transistor T42 is electrically connected to the first node Q(n). The first auxiliary module 401 is electrically connected to the gate of the first pull-down maintaining transistor T42 and is configured to control an on/off state of the first pull-down maintaining transistor T42.

The pull-up control module 10 could control the pull-up module 20 to work by controlling the voltage level of the first node Q(n) such that the gate signal G(n) outputted by the scan line is the corresponding working voltage. The pull-down module 30 could control the gate signal G(n) outputted by the scan line to be a corresponding non-working voltage. The first pull-down maintaining module 40 could maintain the voltage level of the first node Q(n). In addition, the gate signal G(n) could be outputted to the corresponding sub-pixels. Here, the gate signal G(n) could turn on the sub-pixels to display a corresponding image. When the gate signal G(n) corresponds to the non-working voltage, the corresponding sub-pixels could maintain the displayed image. At the same time, the gate signal G(n+1) corresponds to the working voltage to turn on corresponding sub-pixels to display a corresponding image. Therefore, when the gate signal G(n) cannot transit from the working voltage to the non-working voltage on time, the data signal corresponding to the next line will also be outputted to the current line and the display abnormality occurs.

In this embodiment, each of the transistors in the gate driving unit 100 is an N-type transistor, the threshold voltage of the first pull-down maintaining transistor T42 is larger than or equal to 0, and the working voltage is larger than the non-working voltage in each of the stages of the gate signal. However, please note, this is only an example, not a limitation of the present disclosure. There is no limitation on the type of the transistor in the gate driving unit 100. Furthermore, there is no limitation on the relative relationship between the working voltage and the non-working voltage.

Figure 1:
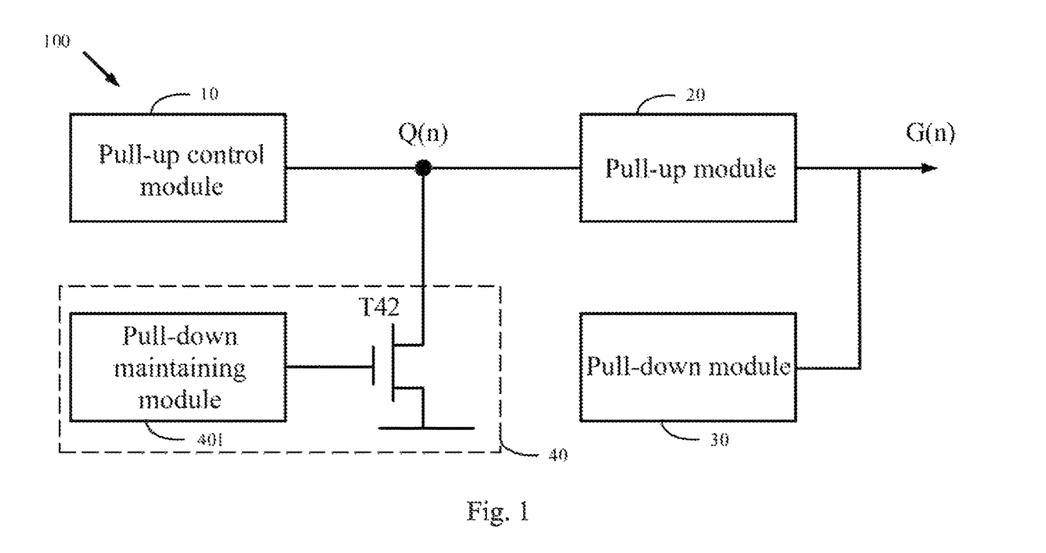
FIG. 1 is a block diagram of a gate driving unit according to a first embodiment of the present disclosure.
Figure 2:
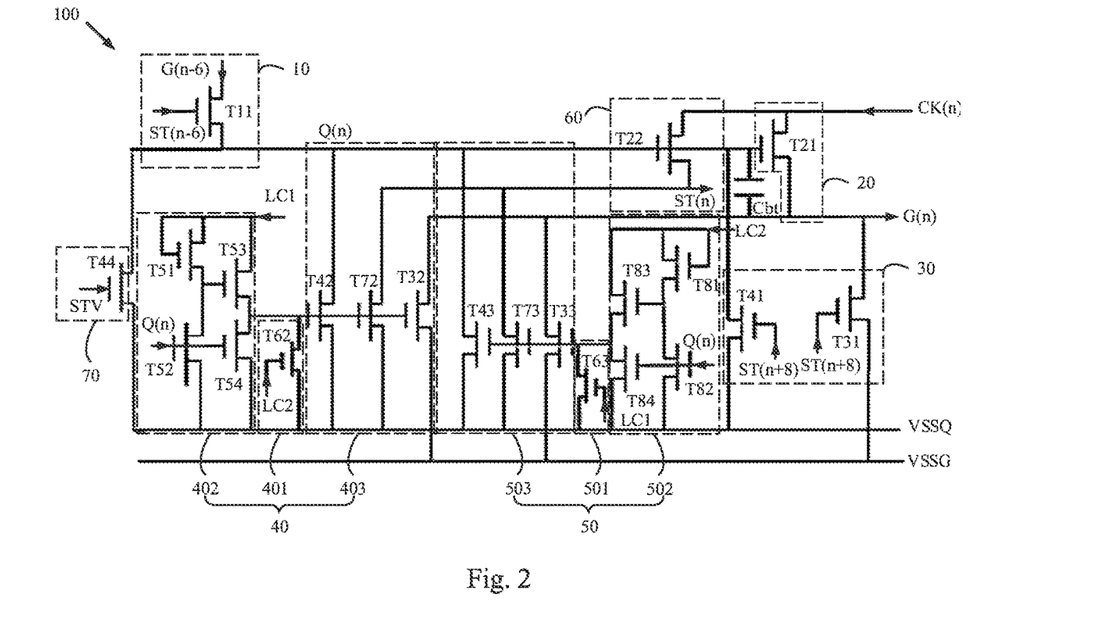
FIG. 2 is a circuit diagram of a gate driving unit according to a second embodiment of the present disclosure.
Figure 3:
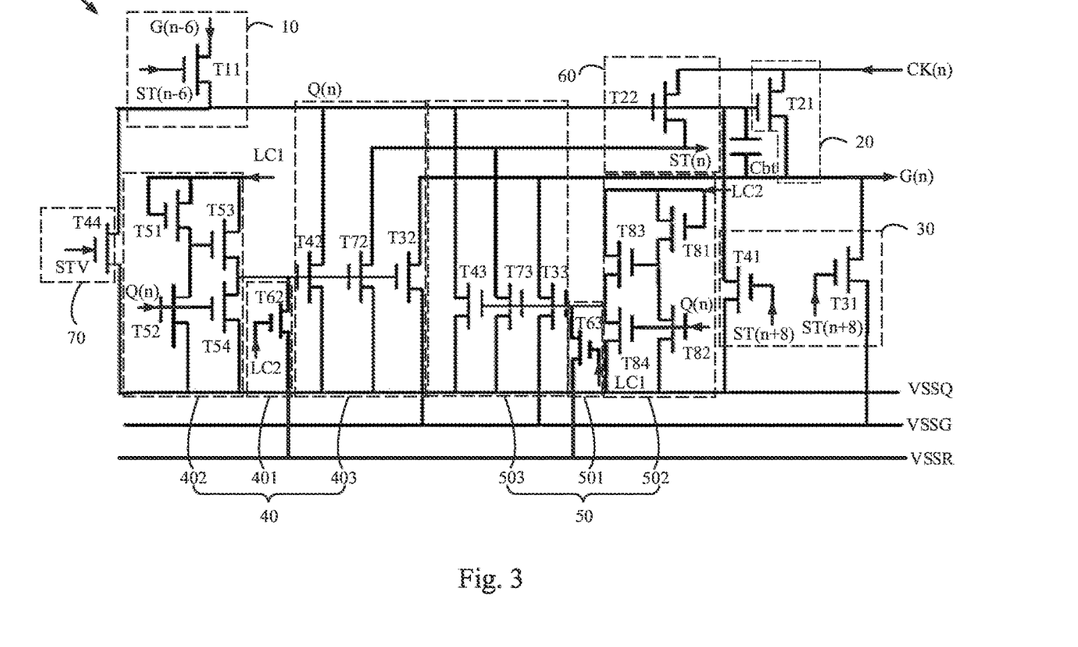
FIG. 3 is a circuit diagram of a gate driving unit according to a third embodiment of the present disclosure.
Figure 4:
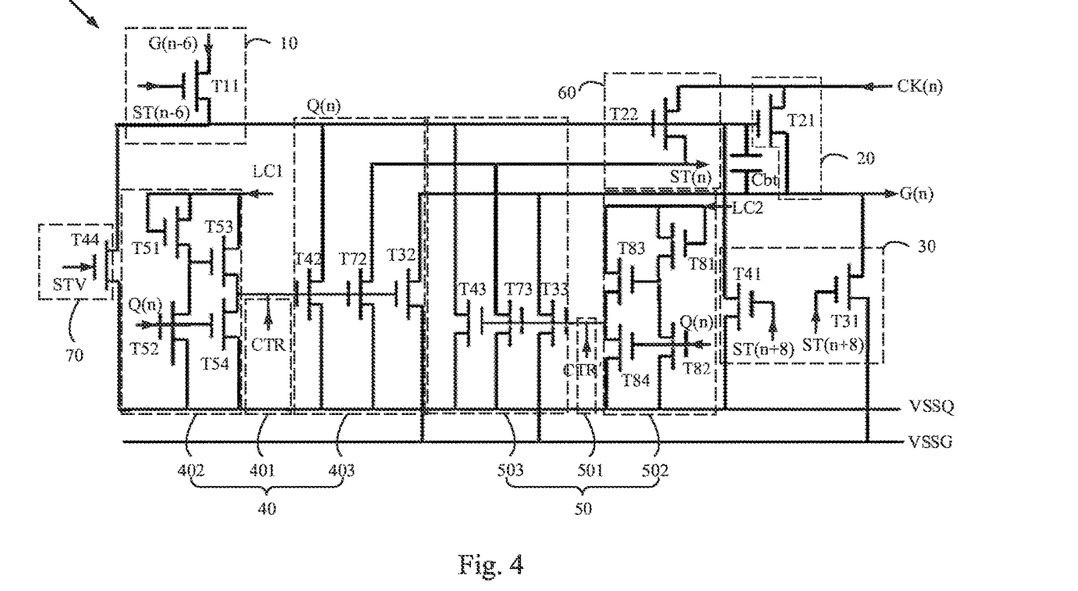
FIG. 4 is a circuit diagram of a gate driving unit according to a fourth embodiment of the present disclosure.

The pull-up control module 10 could comprise a pull-up control transistor T11. The gate of the pull-up control transistor T11 receives the $(n-6)^{th}$-stage stage signal ST(n−6). The source of the pull-up control transistor T11 receives the $(n-6)^{th}$-stage gate signal G(n−6). The drain of pull-up control transistor T11 is connected to the first node Q(n). The pull-up module 20 could comprise a pull-up transistor T21. The gate of the pull-up transistor T21 could be electrically connected to the first node Q(n). The source of the pull-up transistor T21 could receive a clock signal CK(n). The drain of the pull-up transistor T21 could be electrically connected to the scan line. The gate driving unit 10 could further comprise a bootstrap capacitor Cbt electrically connected between the gate of the pull-up transistor T21 and the drain of the pull-up transistor T21. The pull-down module 30 could comprise a first pull-down transistor T41 and a second pull-down transistor T31. The gate of the first pull-down transistor T41 and the gate of the second pull-down transistor T31 both receive the $(n+8)^{th}$-stage stage signal ST(n+8). The source of the first pull-down transistor T41 could receive a first pull-down signal. The drain of the first pull-down transistor T41 could be electrically connected to the first node Q(n). The source of the second pull-down transistor T31 could receive the second pull-down signal. The drain of the second pull-down transistor T31 could be electrically connected to the scan line.

When the $(n-6)^{th}$-stage stage signal ST(n−6) corresponds to a high voltage level, the $(n-6)^{th}$-stage gate signal G(n−6) also corresponds to a high voltage level. The pull-up control transistor T11 is turned on such that the voltage level of the first node Q(n) rises to be a first high voltage level under the effect of the $(n-6)^{th}$-stage stage signal ST(n−6). After this, the clock signal CK(n) corresponds to a high voltage level. Because the first node Q(n) corresponds to the first high voltage level, the pull-up transistor T21 is turned on and thus the scan line could output a corresponding high voltage level as the working voltage of the gate signal G(n). At the same time, under the effect of the clock signal CK(n) and the bootstrap capacitor Cbt, the voltage level of the first node Q(n) rises from the first high voltage level to a second high voltage level. And then, the $(n+8)^{th}$-stage gate signal G(n+8) corresponds to a high voltage level, the first pull-down signal could pull down the voltage level of the first node Q(n) through the first pull-down transistor T41 and the second pull-down signal could pull down the voltage level of the scan line through the second pull-down transistor T31. And then, at least the first pull-down maintaining transistor T42 in the first pull-down maintaining module 40 is turned on to maintain the pulled-down voltage level of the first node Q(n). Please note, the above-mentioned signals and structures of the pull-up control module 10, the pull-up module 20 and the pull-down module 30 are taken as an example, not a limitation of the present disclosure.

Figure 5:
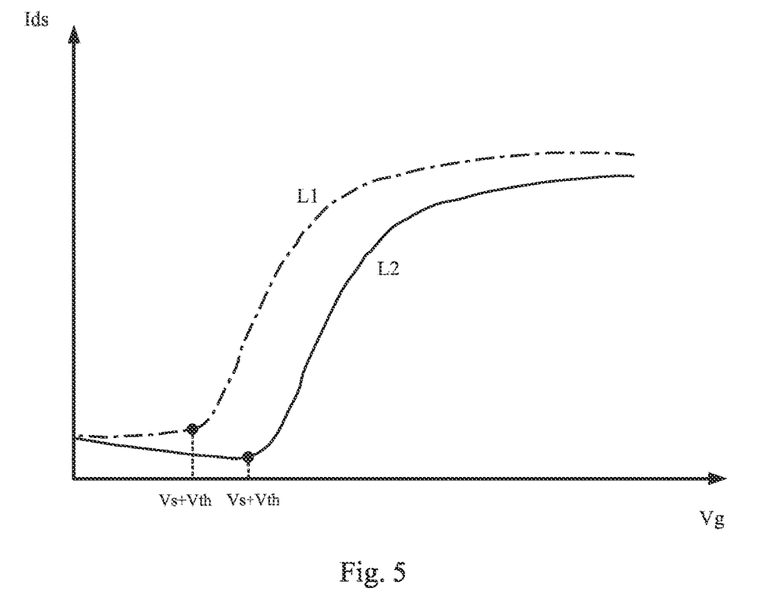
FIG. 5 is a diagram showing a transfer function curve shift of a transistor according to an embodiment of the present disclosure.
Figure 6:
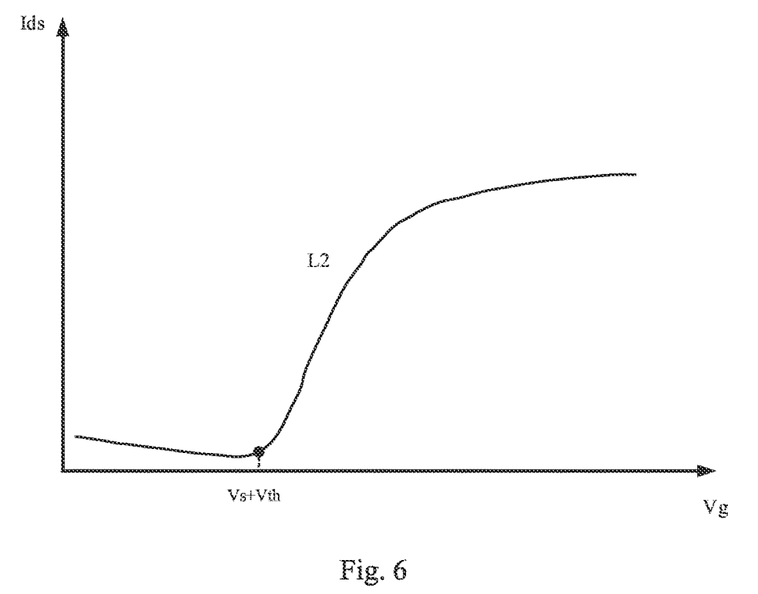
FIG. 6 is a diagram showing a shifted transfer function curve of a transistor according to an embodiment of the present disclosure.

As shown in FIG. 5, L1 is a transfer function curve in the saturation region of the transistor when the threshold voltage does not shift. Under the condition that the voltage difference between the source and the drain of the transistor, the horizontal axis represents the gate voltage Vg of the transistor and the vertical axis represents the drain current Ids of the transistor. It could be seen that the drain current Ids increases as the gate voltage Vg increases under the condition that the voltage difference between the gate voltage Vg and the source voltage Vs is larger than the threshold voltage Vth (that is, the gate voltage Vg is larger than Vs+Vth). From the above, the drain of the first pull-down maintaining transistor T42 of the pull-down maintaining module 40 is electrically connected to the first node Q(n). That is, the first pull-down maintaining transistor T42 could maintain the pulled-down voltage of the first node Q(n) when it's turned on such that the gate signal G(n) outputted by the scan line could maintain the non-working voltage. In this step, the first pull-down maintaining transistor T42 is forward biased. However, due to the manufacturing process or some other reasons, when the first pull-down maintaining transistor T42 is turned off, the gate voltage of the first pull-down maintaining transistor T42 may still be equal to the source voltage of the drain voltage of the first pull-down maintaining transistor T42 such that the first pull-down maintaining transistor T42 is still forward biased. From FIG. 5 and FIG. 6, the threshold voltage of the first pull-down maintaining transistor T42 shifts to Vth' such that the transfer function curve of the pull-down maintaining transistor T42 shift from L1 to L2. In this way, the drain current Ids corresponding to the gate voltage Vg of the first pull-down maintaining transistor T42 in a later stage reduces and cannot well turn on the first pull-down maintaining transistor T42 such that the first pull-down maintaining transistor T42 cannot well maintain the pulled-down gate signal G(n). Thus, this results in a display abnormality. Furthermore, as shown in FIG. 6, when the gate voltage Vg of the transistor is lower than Vs+Vth, the drain current Ids still exists such that the first pull-down maintaining transistor T42 cannot be normally turned off.

In this embodiment, the first auxiliary module 401 is electrically connected to the gate of the first pull-down maintaining transistor T42 and is configured to turn off the first pull-down maintaining transistor T42. That is, the first auxiliary module 401 controls the gate voltage of the first pull-down maintaining transistor T42 such that the first pull-down maintaining transistor T42 is turned off. This prevents the first pull-down maintaining transistor T42 from being turned on for a long time to shift the threshold voltage and also reduces the risk that the first pull-down maintaining transistor T42 cannot be able to normally maintain the pull-downed voltage of the first node Q(n). Thus, this alleviates the risk that the pull-up control module 10 cannot control the scan line to output a correct gate signal G(n) and the risk of display abnormality. Thus, the display quality is improved.

The first auxiliary module 401 comprises a first auxiliary transistor T62. The drain of the first auxiliary transistor T62 is electrically connected to the gate of the first pull-down maintaining transistor T42. The source of the first auxiliary transistor T62 is electrically connected to the auxiliary power line to receive an auxiliary signal. The gate of the first auxiliary transistor T62 is connected to a first control signal line to receive a first control signal. In this embodiment, the first control signal is configured to turn on the first auxiliary transistor T62 to allow the auxiliary signal to control the on/off state of the first pull-down maintaining transistor T42.

Because the first auxiliary transistor T62 and the first pull-down maintaining transistor T42 are both N-type transistors, when the voltage level of the first control signal at the gate of the first auxiliary transistor T62 is larger than the voltage level of the auxiliary signal at the source of the first auxiliary transistor T62 and the absolute value of the voltage difference is larger than the threshold voltage of the first auxiliary transistor T62, the first auxiliary transistor T62 is turned on. in addition, from the above, because the first pull-down maintaining transistor T42 could pull down the first node Q(n) when it's turned on, the voltage level of the source of the first pull-down maintaining transistor T42 could be regarded as being lower than the voltage level of the auxiliary signal and the absolute value of the voltage difference is larger than the threshold voltage of the first pull-down maintaining transistor T42. That is, the auxiliary signal could be sent to the gate of the first auxiliary transistor T62 through the first auxiliary transistor T62 to turn off the first pull-down maintaining transistor T42. This prevents the first pull-down maintaining transistor T42 from being turned on for a long time to shift the threshold voltage. This reduces the risk that the first pull-down maintaining transistor T42 cannot maintain the pulled-down voltage of the first node Q(n) and reduces the risk that the pull-up control module 10 cannot control the scan line to output a correct gate signal G(n). Thus, this reduces the risk of display abnormality and improves the display quality.

The gate driving unit 100 further comprises a second pull-down maintaining module 50. The second pull-down maintaining module 50 comprises a second pull-down maintaining transistor T43. The gate of the second pull-down maintaining transistor T43 is electrically connected to a second pull-down maintaining line to receive a second pull-down maintaining signal LC2. The source of the second pull-down maintaining transistor T43 and the source of the first pull-down maintaining transistor T42 are electrically connected to the first power line to receive a first power signal VSSQ. The drain of the second pull-down maintaining transistor T43 is electrically connected to the first node Q(n). Here, the second pull-down maintaining signal LC2 comprises alternatively-arranged high voltages and low voltages. That is, in this embodiment, the high voltages in the second pull-down maintaining signal LC2 applied on the gate of the second pull-down maintaining transistor T43 could turn on the second pull-down maintaining transistor T43 such that the first power signal VSSQ is transferred to the first node Q(n) through the second pull-down maintaining transistor T43. Because the pull-up transistor T21 is an N-type transistor, the first power signal VSSQ could be regarded as a constant voltage signal to pull down the voltage level of the first node Q(n) such that the pull-up transistor T21 is turned off. Surely, the first power signal VSSQ at the source of the first pull-down maintaining transistor T42 could pull down the voltage level of the first node Q(n) when the first pull-down maintaining transistor T42 is turned on.

The high voltage level of the second pull-down maintaining signal LC2 could turn on the second pull-down maintaining transistor T43. It could be understood that the first control signal is identical to the second pull-down maintaining signal LC2. Because of the effect of the first control signal, it could be understood that the high voltage levels of the second pull-down maintaining signal LC2 could further turn on the first auxiliary transistor T62. Therefore, in this embodiment, the first control signal is set to be the same as the second pull-down maintaining signal LC2. In this way, the first pull-down maintaining transistor T42 could be turned on at the time when the second pull-down maintaining transistor T43 is turned on. Furthermore, the number of signals could be reduced. In addition, when the second pull-down maintaining transistor T43 is turned on, the first pull-down maintaining transistor T42 could be turned off on time to prevent the first pull-down maintaining transistor T42 from continuously working. This could pull down the voltage level of the first node Q(n) and alleviate the shift of the threshold voltage of the first pull-down maintaining transistor T42.

As shown in FIG. 2, the auxiliary power line and the first power line are the same line. From the above, the first power line carries the first power signal VSSQ. That is, the auxiliary power line also carries the first power signal VSSQ such that the source of the first auxiliary transistor T62 and the source of the first pull-down maintaining transistor T42 both receives the first power signal VSSQ through the auxiliary power line or the first power line. Here, the source of the first pull-down maintaining transistor T42 is electrically connected to the first power line to receive the first power signal VSSQ and the threshold voltage of the first pull-down maintaining transistor T42 is larger than or equal to 0. In this embodiment, the source of the first auxiliary transistor T62 receives the first power signal VSSQ such that the gate voltage of the second pull-down maintaining transistor T43 is equal to the first power signal VSSQ when the first auxiliary transistor T62 is turned on. At this time, the voltage difference between the gate and the source of the first pull-down maintaining transistor T42 is 0, which is lower than the threshold voltage of the first pull-down maintaining transistor T42, and thus the first pull-down maintaining transistor T42 is turned off.

As shown in FIG. 3, the auxiliary power line and the first power line are different lines such that the auxiliary signal is different from the first power signal VSSQ. Specifically, the auxiliary signal VSSR carried by the auxiliary power line could also be a constant signal. From the above, the auxiliary signal turns off the first pull-down maintaining transistor T42. Here, the threshold voltage of the first pull-down maintaining transistor T42 is larger than or equal to 0. The voltage level of the auxiliary signal VSSR could be lower than the voltage level of the first power signal VSSQ such that the gate voltage of the first pull-down maintaining transistor T42 is lower than the voltage level of the first power signal VSSQ (that is, the gate voltage of the first pull-down maintaining transistor T42 is lower than the source voltage of the first pull-down maintaining transistor T42) when the first auxiliary transistor T62 is turned on. In other words, at this time, the gate voltage of the first pull-down maintaining transistor T42 is lower than the threshold voltage of the first pull-down maintaining transistor T42. From the curve L1 shown in FIG. 5, it could be seen that the lower the voltage level of the gate of the first pull-down maintaining transistor T42, the lower the drain current Ids of the first pull-down maintaining transistor T42. It could better turn off the first pull-down maintaining transistor T42.

The second pull-down maintaining module 50 further comprises a second auxiliary module 501. The second auxiliary module 501 is electrically connected to the gate of the second pull-down maintaining transistor T43. The second auxiliary module 501 is configured to control the on/off state of the second pull-down maintaining transistor T43. Specifically, the gate of the second pull-down maintaining transistor T43 is electrically connected to the second pull-down maintaining line to receive the second pull-down maintaining signal LC2. The source of the second pull-down maintaining transistor T43 is electrically connected to the first power line to receive the first power signal VSSQ. The drain of the second pull-down maintaining transistor T43 is electrically connected to the first node Q(n). The high voltages in the second pull-down maintaining signal LC2 turn on the second pull-down maintaining transistor T43 to allow the first power signal VSSQ to pull down the voltage level of the first node Q(n). Therefore, in this embodiment, the second auxiliary module 501 could turn off the second pull-down maintaining transistor T43. Similarly, from the above disclosure about the first auxiliary module 401 that could turn off the first pull-down maintaining transistor T42, it could be understood that the gate voltage of the second pull-down maintaining transistor T43 in this embodiment could be controlled by the second auxiliary module 501 to turn off the second pull-down maintaining transistor T43. This could prevent the second pull-down maintaining transistor T43 from being turned on for a long time to shift the threshold voltage. This could reduce the risk that the pull-up control module 10 cannot control the scan line to output the correct gate signal G(n). This reduces the risk of display abnormality and improves the display quality.

Figure 7:
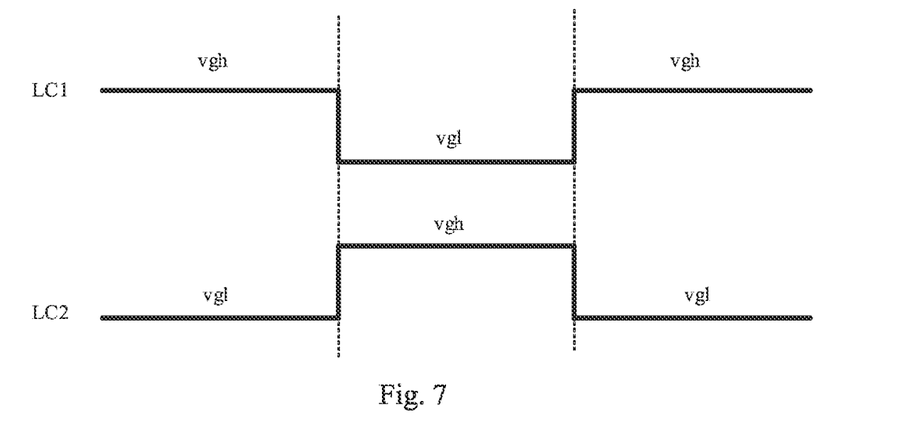
FIG. 7 is a diagram of waveforms of signals according to an embodiment of the present disclosure.

The second auxiliary module 501 comprises a second auxiliary transistor T63. The drain of the second auxiliary transistor T63 is electrically connected to the gate of the second pull-down maintaining transistor T43. The source of the second auxiliary transistor T63 is electrically connected to the auxiliary power line to receive an auxiliary signal. The gate of the second auxiliary transistor T63 is connected to a second control signal line to receive a second control signal. In this embodiment, the gate of the first pull-down maintaining transistor T42 is electrically connected to the first pull-down maintaining line to receive the first pull-down maintaining signal LC1. The first pull-down maintaining signal LC1 is configured to turn on the first pull-down maintaining transistor T42 to allow the first power signal VSSQ to control the voltage level of the first node Q(n). The first pull-down maintaining signal LC1 comprises alternatively-arranged high voltages and low voltages. As shown in FIG. 7, the high voltages vgh of the first pull-down maintaining signal LC1 are corresponding to the low voltages vgl of the second pull-down maintaining signal LC2. Here, the second control signal is identical to the first pull-down maintaining signal LC1.

The control mechanism for the second auxiliary transistor T63 to control the second pull-down maintaining transistor T43 could be referred to the control mechanism for the first auxiliary transistor T62 to control the first pull-down maintaining transistor T42. Further illustration is omitted for simplicity.

The high voltages vgh of the second pull-down maintaining signal LC2 turns on the second pull-down maintaining transistor T43 and turns off the first pull-down maintaining transistor T42. Similarly, the high voltages vgh of the first pull-down maintaining signal LC1 turns on the first pull-down maintaining transistor T42 and turns off the second pull-down maintaining transistor T43. Therefore, in this embodiment, by setting the second control signal to be identical to the first pull-down maintaining signal LC1, the present disclosure could reduce the number of types of the signals and on time turn off the second pull-down maintaining transistor T43 to prevent second pull-down maintaining transistor T43 from continuously working when the first pull-down maintaining transistor T42 is turned on to work. Accordingly, the present disclosure could effectively pull down the voltage level of the first node Q(n) and alleviate the shift of the threshold voltage of the second pull-down maintaining transistor T43.

As shown in FIG. 7, the high voltages vgh of the first pull-down maintaining signal LC1 are correspondingly positioned to the low voltages vgl of the second pull-down maintaining signal LC2. Similarly, the high voltages vgh of the second pull-down maintaining signal LC2 are correspondingly positioned to the low voltages vgl of the first pull-down maintaining signal LC1. From the above, the high voltages vgh in the first pull-down maintaining signal LC1 and the high voltages vgh in the second pull-down maintaining signal LC2 are alternatively arranged such that the first pull-down maintaining transistor T42 and the second pull-down maintaining transistor T43 are alternatively turned on.

Correspondingly, the first pull-down maintaining transistor T42 and the second pull-down maintaining transistor T43 are alternatively turned off as well. This could maintain the pulled-down voltage level of the first node Q(n) and alternatively turn off the first pull-down maintaining transistor T42 and the second pull-down maintaining transistor T43. In this way, the present disclosure could maintain the pulled-down voltage level of the first node Q(n)a and alternatively turn off the first pull-down maintaining transistor T42 and the second pull-down maintaining transistor T43 to prevent any of the first pull-down maintaining transistor T42 and the second pull-down maintaining transistor T43 form working for too long to normally maintain the voltage level of the first node Q(n). In addition, it also reduces the risk that the pull-up control module 10 cannot control the scan line to output the correct gate signal G(n) and thus reduces the risk of display abnormality and improves the display quality.

As shown in FIG. 4, the first auxiliary module 401 comprises a control signal line, configured to carry a control signal CTR. The control signal line is electrically connected to the gate of the first pull-down maintaining transistor T42. Here, the control signal CTR comprises a plurality of effective voltage levels arranged at intervals. Each of the effective voltage levels is used to control the on/off state of the first pull-down maintaining transistor T42. In this embodiment, the first auxiliary module comprises the first auxiliary transistor T62 and control the gate voltage of the first pull-down maintaining transistor T42 in coordination with the auxiliary signal and the first control signal such that the first pull-down maintaining transistor T42 has a turn-off period. Specifically, in this embodiment, the control signal CTR could be regarded as a signal generated by the first auxiliary transistor T62, the auxiliary signal and the first control signal and applied as the gate voltage of the first pull-down maintaining transistor T42. When the connection relationship among the first auxiliary transistor T62, the auxiliary signal and the first control signal are determined, the gate voltage of the first pull-down maintaining transistor T42 is determined. That is, the control signal CTR could be determined according to, for example, the above factors in this embodiment.

In the following disclosure, the control signal CTR is the signal generated by the coordination of the first auxiliary transistor T62, the auxiliary signal and the first control signal. Each of the effective voltage levels in the control signal CTR could be regarded as the voltage levels of the auxiliary signal. The time period of each effective voltage level could correspond to the time period for the first control signal to turn on the first auxiliary transistor T62. That is, each of the effective voltage levels of the control signal CTR is applied on the first auxiliary transistor T62. This is similar to the effect of the auxiliary applied on the first pull-down maintaining transistor T42 through the first auxiliary transistor T42. Their effects are both for turning off the first pull-down maintaining transistor T42. It could be understood that the first auxiliary module 401 in this embodiment comprises the control signal line carrying the control signal CTR. This could reduce the time period and the number of wires and thus simplifies the circuit structure of the gate driving unit 100.

The second auxiliary module 501 could be referred to the arrangements shown in FIG. 2 and FIG. 3. Or, as shown in FIG. 4, the second auxiliary module 501 comprises a third control signal line carrying a third control signal CTR'. The control signal line is electrically connected to the gate of the second pull-down maintaining transistor T43. Here, the third control signal CTR' also comprises a plurality of effective voltage levels arranged at intervals. Each of the effective voltage levels is configured to turn off the second pull-down maintaining transistor T43.

In one embodiment, the first pull-down maintaining module 40 further comprises a first inverter module 402, electrically connected to the first node Q(n) and the gate of the first pull-down maintaining transistor T42, configured to turn on the first pull-down maintaining transistor T42. Here, the first inverter module 403 could output the opposite value of the voltage level of the first node Q(n) to the gate of the first pull-down maintaining transistor T42. For example, if the first node Q(n) corresponds to a low voltage level, the gate of the first pull-down maintaining transistor T42 corresponds to a high voltage level and the first pull-down maintaining transistor T42 is turned on. From the above, the first pull-down maintaining transistor T42 is turned on to maintain the pulled-down voltage of the first node Q(n). Furthermore, if the first node Q(n) corresponds to a high voltage level, the gate of the first pull-down maintaining transistor T42 corresponds to a low voltage level and the first pull-down maintaining transistor T42 is not turned on and thus the voltage level of the first node Q(n) is not pulled down.

The first inverter module 402 could comprise a first inverter transistor T51, a second inverter transistor T52, a third inverter transistor T53 and a fourth inverter transistor T54. The source of the first inverter transistor T51, the gate of the first inverter transistor T51 and the source of the third inverter transistor T53 receive the first pull-down maintaining signal LC1. The drain of the first inverter transistor T51 is electrically connected to the gate of the third inverter transistor T53. The gate of the second inverter transistor T52 and the gate of the fourth inverter transistor T54 are electrically connected to the first node Q(n). The drain of the second inverter transistor T52 and the drain of the fourth transistor T54 receive the first power signal VSSQ. The source of the second inverter transistor T52 is electrically connected to the drain of the first inverter transistor T51. The source of the fourth inverter transistor T54 is electrically connected to the drain of the third inverter transistor T53. From the above, when the first node Q(n) corresponds to a low voltage level and the first pull-down maintaining signal LC1 corresponds to a high voltage level, the second inverter transistor T52 and the fourth inverter transistor T54 are turned off, and the first inverter transistor T51 and the third inverter transistor T53 are turned on such that the first pull-down maintaining transistor T42 is turned on to transfer the first power signal VSSQ to the first node Q(n) to pull down the first node Q(n).

The first pull-down maintaining module 40 could further comprise a third pull-down maintaining transistor T32. The gate of the third pull-down maintaining transistor T32 is electrically connected to the gate of the first pull-down maintaining transistor T42. The source of the third pull-down maintaining transistor T32 is electrically connected to the second power line to receive the second power signal VSSG. The drain of the third pull-down maintaining transistor T32 is electrically connected to the scan line. That is, the third pull-down maintaining transistor T32 could pull down the gate signal G(n) on the scan line under the control of the first inverter module 402 and could be turned off under the control of the first auxiliary module 401 to prevent from continuous work. Here, the second power signal VSSG could be regarded as a constant voltage signal for pulling down the gate signal G(n). Surely, the source of the second pull-down maintaining transistor T32 could be electrically connected to the source of the first pull-down maintaining transistor T42 to share the first power signal VSSQ to further reduce the number of wires.

The gate driving unit 100 could further comprise a stage module 60. The stage module 60 could comprise a stage transistor T22. The gate of the stage transistor T22 is electrically connected to the first node Q(n). The source of the stage transistor T22 receives the clock signal CK(n). The drain of the stage transistor T22 outputs the stage signal ST(n). By controlling the voltage level of the first node Q(n), the stage transistor T22 could be turned on. Further with the clock signal CK(n), the stage signal ST(n) is controlled to control the working state of the pull-up control module 10 in the following stage of the gate driving unit 100. Based on this, the first pull-down maintaining module 40 could further comprise a fourth pull-down maintaining transistor T72. The gate of the fourth pull-down maintaining transistor T72 is electrically connected to the gate of the first pull-down maintaining transistor T42. The source of the fourth pull-down maintaining transistor T72 is electrically connected to the source of the first pull-down maintaining transistor T42. The drain of the fourth pull-down maintaining transistor T72 is electrically connected to the drain of the stage transistor T22. That is, the fourth pull-down maintaining transistor T72 could pull down the stage signal ST(n) under the control of the first inverter module 402 and could be turned off under the control of the first auxiliary module 401 to prevent from continuous work. Here, the first pull-down maintaining transistor T42, the fourth pull-down maintaining transistor T727 and the third pull-down maintaining transistor T32 could form a first pull-down maintaining sub-module 403 to pull down the first node Q(n), the stage signal ST(n) and the gate signal G(n).

The second pull-down maintaining module 50 could be referred to the arrangement of the first pull-down maintaining module 40. Specifically, the second pull-down maintaining module 50 could comprise a second inverter module 502 and a second pull-down maintaining sub-module 503. Here, the second inverter module 502 could comprise a fifth inverter transistor T81, a sixth inverter transistor T82, a seventh inverter transistor T83 and an eighth inverter transistor T84. The fifth inverter transistor T81 could be referred to the arrangement of the first inverter transistor T51. The sixth inverter transistor T82 could be referred to the arrangement of the second inverter transistor T52. The seventh inverter transistor T83 could be referred to the arrangement of the third inverter transistor T53. The eighth inverter transistor T84 could be referred to the arrangement of the fourth inverter transistor T54. The difference is that the first pull-down maintaining signal LC1 is replaced with the second pull-down maintaining signal LC2. The second pull-down maintaining sub-module 503 could comprise the above-mentioned second pull-down maintaining transistor T43, the fifth inverting transistor T33 and the sixth inverter maintaining transistor T73. The fifth inverting transistor T33 could be referred to the arrangement of the third pull-down maintaining transistor T32. The sixth inverting transistor T73 could be referred to the arrangement of the fourth pull-down maintaining transistor T72.

The gate driving unit 100 could further comprise a resetting module 70. The resetting module 70 could comprise a resetting transistor T44. The gate of the resetting transistor T44 receives a resetting signal STV. The source of the resetting transistor T44 receives the first power signal VSSQ. The drain of the resetting transistor T44 is electrically connected to the first node Q(n). Accordingly, the resetting transistor T44 could be turned on by the resetting signal STV to reset the voltage level of the first node Q(n). This could prevent the voltage level of the first node Q(n) from being a high voltage level for a long time and reduce the risk of threshold voltage shift of, for example but not limited to, the stage transistor T22.

According to an embodiment of the present disclosure, a display panel is disclosed. The display panel comprises a gate driving circuit of any of the above-mentioned embodiments.

The present disclosure discloses a gate driving circuit and a display panel. The gate driving circuit includes a plurality of cascaded gate driving units. Each of the gate driving unit includes a pull-up control module, a pull-up module electrically connected to the pull-up control module through a first node and electrically connected to a scan line, a pull-down module electrically connected to the scan line, and a first pull-down maintaining module. The first pull-down maintaining module includes a first auxiliary module and a first pull-down maintaining transistor having a drain connected to the first node. The first auxiliary module, electrically connected to a gate of the first pull-down maintaining transistor, and configured to control an on/off state of the first pull-down maintaining transistor. The present disclosure utilizes a first auxiliary module, which is electrically connected to the gate of the first pull-down maintaining module, to control the on/off state of the pull-down maintaining transistor. By turning off the pull-down maintaining transistor, it could prevent the pull-down maintaining transistor from being turned on for too long to control the scan line to output a correct gate signal. This alleviates the risk of display abnormality and improves the display quality.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A gate driving circuit, comprising a plurality of cascaded gate driving units, each of the gate driving unit comprising:
   a pull-up control module;
   a pull-up module, electrically connected to the pull-up control module through a first node and electrically connected to a scan line;
   a pull-down module, electrically connected to the scan line;
   a first pull-down maintaining module, comprising:
      a first pull-down maintaining transistor, having a drain connected to the first node; and
      a first auxiliary module, electrically connected to a gate of the first pull-down maintaining transistor, configured to control an on/off state of the first pull-down maintaining transistor; and
   a second pull-down maintaining module, comprising:
      a second pull-down maintaining transistor, having a gate electrically connected to a second pull-down maintaining line to receive a second pull-down maintaining signal, a source electrically connected to the first pull-down maintaining transistor and a first power line to receive a first power signal, and a drain electrically connected to the first node;
   wherein the first auxiliary module comprises:

a first auxiliary transistor, having a drain electrically connected to the gate of the first pull-down maintaining transistor, a source electrically connected to an auxiliary power line to receive an auxiliary signal, and a gate connected to a first control signal line to receive a first control signal;

wherein the first control signal is configured to turn on the first auxiliary transistor to allow the auxiliary signal to turn off the first pull-down maintaining transistor in on-state, wherein the first control signal is identical to the second pull-down maintaining signal, and the second pull-down maintaining signal comprises alternatively-arranged high voltage levels and low voltage levels;

wherein the first pull-down maintaining transistor and the second pull-down maintaining transistor are alternatively turned on, and the first pull-down maintaining transistor and the second pull-down maintaining transistor are alternatively turned off;

wherein the first pull-down maintaining module further comprises:

a first converting module, electrically connected to the first node and the gate of the first pull-down maintaining transistor, configured to turn on the first pull-down maintaining transistor.

2. The gate driving circuit of claim 1, wherein the second pull-down maintaining signal is configured to turn on the second pull-down maintaining transistor to allow the first power signal to control a voltage level of the first node.

3. The gate driving circuit of claim 2, wherein the auxiliary power line and the first power line are a same line.

4. The gate driving circuit of claim 2, wherein the auxiliary power line and the first power line are different lines such that the auxiliary signal is different from the first power signal.

5. The gate driving circuit of claim 2, wherein the second pull-down maintaining module further comprises:

a second auxiliary module, electrically connected to a gate of the second pull-down maintaining transistor, configured to control an on/off state of the second pull-down maintaining transistor.

6. The gate driving circuit of claim 5, wherein the second auxiliary module further comprises:

a second auxiliary transistor, having a drain electrically connected to the gate of the second pull-down maintaining transistor, a source electrically connected to the auxiliary power line to receive the auxiliary signal, and a gate connected to a second control signal line to receive a second control signal;

wherein a gate of the first pull-down maintaining transistor is electrically connected to a first pull-down maintaining line to receive a first pull-down maintaining signal;

wherein the first pull-down maintaining signal is configured to turn on the first pull-down maintaining transistor to allow the first power signal to control the voltage level of the first node, the first pull-down maintaining signal comprises alternatively-arranged high voltage levels and low voltage levels, and the high voltage levels of the first pull-down maintaining signal are corresponding to the low voltage levels of the second pull-down maintaining signal; and wherein the second control signal is identical to the first pull-down maintaining signal.

7. The gate driving circuit of claim 1, wherein the first converting module comprises a first inverter transistor, a second inverter transistor, a third inverter transistor, and a fourth inverter transistor;

a source of the first inverter transistor, a gate of the first inverter transistor, and a source of the third inverter transistor are configured to receive a first pull-down maintaining signal, and a drain of the first inverter transistor is electrically connected to a gate of the third inverter transistor; and a gate of the second inverter transistor and a gate of the fourth inverter transistor are electrically connected to the first node, a drain of the second inverter transistor and a drain of the fourth transistor are configured to receive the first power signal, a source of the second inverter transistor is electrically connected to the drain of the first inverter transistor, and a source of the fourth inverter transistor is electrically connected to a drain of the third inverter transistor;

wherein the first pull-down maintaining signal comprises alternatively-arranged high voltage levels and low voltage levels, and the high voltage levels of the first pull-down maintaining signal are corresponding to the low voltage levels of the second pull-down maintaining signal.

8. A gate driving circuit, comprising a plurality of cascaded gate driving units, each of the gate driving unit comprising:

a pull-up control module;

a pull-up module, electrically connected to the pull-up control module through a first node and electrically connected to a scan line;

a pull-down module, electrically connected to the scan line;

a first pull-down maintaining module, comprising:

a first pull-down maintaining transistor, having a drain connected to the first node; and a first auxiliary module, electrically connected to a gate of the first pull-down maintaining transistor, configured to turn off the first pull-down maintaining transistor in on-state; and a second pull-down maintaining module, comprising:

a second pull-down maintaining transistor, having a gate electrically connected to a second pull-down maintaining line to receive a second pull-down maintaining signal, a source electrically connected to the first pull-down maintaining transistor and a first power line to receive a first power signal, and a drain electrically connected to the first node; and a second auxiliary module, electrically connected to the gate of the second pull-down maintaining transistor, configured to control an on/off state of the second pull-down maintaining transistor;

wherein the first pull-down maintaining transistor and the second pull-down maintaining transistor are alternatively turned on, and the first pull-down maintaining transistor and the second pull-down maintaining transistor are alternatively turned off;

wherein the first pull-down maintaining module further comprises:

a first converting module, electrically connected to the first node and the gate of the first pull-down maintaining transistor, configured to turn on the first pull-down maintaining transistor.

9. The gate driving circuit of claim 8, wherein the first auxiliary module comprises:

a first auxiliary transistor, having a drain electrically connected to the gate of the first pull-down maintaining transistor, a source electrically connected to an auxiliary power line to receive an auxiliary signal, and a gate connected to a first control signal line to receive a first control signal;

wherein the first control signal is configured to turn on the first auxiliary transistor to allow the auxiliary signal to control the on/off state of the first pull-down maintaining transistor.

10. The gate driving circuit of claim 9, wherein the second pull-down maintaining signal comprises alternatively-arranged high voltage levels and low voltage levels, the second pull-down maintaining signal is configured to turn on the second pull-down maintaining transistor to allow the first power signal to control a voltage level of the first node, and the first control signal is identical to the second pull-down maintaining signal.

11. The gate driving circuit of claim 10, wherein the auxiliary power line and the first power line are a same line.

12. The gate driving circuit of claim 10, wherein the auxiliary power line and the first power line are different lines such that the auxiliary signal is different from the first power signal.

13. The gate driving circuit of claim 10, wherein the second auxiliary module further comprises:

a second auxiliary transistor, having a drain electrically connected to the gate of the second pull-down maintaining transistor, a source electrically connected to the auxiliary power line to receive the auxiliary signal, and a gate connected to a second control signal line to receive a second control signal;

wherein a gate of the first pull-down maintaining transistor is electrically connected to a first pull-down maintaining line to receive a first pull-down maintaining signal;

wherein the first pull-down maintaining signal is configured to turn on the first pull-down maintaining transistor to allow the first power signal to control the voltage level of the first node, the first pull-down maintaining signal comprises alternatively-arranged high voltage levels and low voltage levels, and the high voltage levels of the first pull-down maintaining signal are corresponding to the low voltage levels of the second pull-down maintaining signal; and wherein the second control signal is identical to the first pull-down maintaining signal.

14. The gate driving circuit of claim 10, wherein the first auxiliary module comprises:

a control signal line, electrically connected to the gate of the first pull-down maintaining transistor and carrying a control signal;

wherein the control signal comprises a plurality of effective voltage levels arranged at intervals, and each of the effective voltage levels is configured to control the on/off state of the first pull-down maintaining transistor.

15. A display panel, comprising a gate driving circuit comprising a plurality of cascaded gate driving units, each of the gate driving unit comprising:

a pull-up control module;

a pull-up module, electrically connected to the pull-up control module through a first node and electrically connected to a scan line;

a pull-down module, electrically connected to the scan line;

a first pull-down maintaining module, comprising:
   a first pull-down maintaining transistor, having a drain connected to the first node; and
   a first auxiliary module, electrically connected to a gate of the first pull-down maintaining transistor, configured to turn off the first pull-down maintaining transistor in on-state; and a second pull-down maintaining module, comprising:
   a second pull-down maintaining transistor, having a gate electrically connected to a second pull-down maintaining line to receive a second pull-down maintaining signal, a source electrically connected to the first pull-down maintaining transistor and a first power line to receive a first power signal, and a drain electrically connected to the first node;

wherein the first pull-down maintaining transistor and the second pull-down maintaining transistor are alternatively turned on, and the first pull-down maintaining transistor and the second pull-down maintaining transistor are alternatively turned off;

wherein the first pull-down maintaining module further comprises:

a first converting module, electrically connected to the first node and the gate of the first pull-down maintaining transistor, configured to turn on the first pull-down maintaining transistor;

wherein the first auxiliary module comprises:

a first auxiliary transistor, having a drain electrically connected to the gate of the first pull-down maintaining transistor, a source electrically connected to an auxiliary power line to receive an auxiliary signal, and a gate connected to a first control signal line to receive a first control signal;

wherein the first control signal is configured to turn on the first auxiliary transistor to allow the auxiliary signal to control the on/off state of the first pull-down maintaining transistor; and wherein the second pull-down maintaining signal comprises alternatively-arranged high voltage levels and low voltage levels, the second pull-down maintaining signal is configured to turn on the second pull-down maintaining transistor to allow the first power signal to control a voltage level of the first node, and the first control signal is identical to the second pull-down maintaining signal.

16. The display panel of claim 15, wherein the auxiliary power line and the first power line are a same line.

* * * * *